US006915275B2

(12) United States Patent
Banerjee et al.

(10) Patent No.: US 6,915,275 B2
(45) Date of Patent: Jul. 5, 2005

(54) MANAGING CUSTOMIZATION OF PROJECTS PRIOR TO MANUFACTURE IN AN ELECTRONIC COMMERCE SYSTEM

(75) Inventors: Dwip N. Banerjee, Austin, TX (US); Rabindranath Dutta, Austin, TX (US); Kumar Ravi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 09/876,057

(22) Filed: Jun. 7, 2001

(65) Prior Publication Data

US 2002/0188518 A1 Dec. 12, 2002

(51) Int. Cl.[7] ............................................. G06F 17/60
(52) U.S. Cl. ........................................................ 705/26
(58) Field of Search ............................. 705/26, 27, 37

(56) References Cited

U.S. PATENT DOCUMENTS

| 5,970,475 A | 10/1999 | Barnes et al. ................. 705/27 |
| 6,058,379 A | 5/2000 | Odon et al. ................... 705/37 |
| 6,058,417 A | 5/2000 | Hess et al. .................. 709/219 |
| 6,128,600 A | 10/2000 | Imamura et al. .............. 705/27 |
| 6,169,976 B1 | 1/2001 | Colosso ........................ 705/59 |

(Continued)

FOREIGN PATENT DOCUMENTS

| EP | 1031935 A2 | 8/2000 | ........... G06F/17/60 |
| WO | WO 00/43933 | 7/2000 | ........... G06F/17/17 |
| WO | WO 00/54204 | 9/2000 | ........... G06F/17/60 |
| WO | WO 00/55782 | 9/2000 | ........... G06F/17/60 |
| WO | WO 00/57332 | 9/2000 | ........... G06F/17/60 |
| WO | WO 00/60519 | 10/2000 | ........... G06F/17/60 |
| WO | WO 00/62187 | 10/2000 | ........... G06F/17/00 |

OTHER PUBLICATIONS

Ellis, J., "Greenspan's Fear? Runaway Bulls," Boston Globe, Saturday, Jun. 26, 1999, third section, p. A19.*
Anon., "51 Fun Graphics Introduces Innovative Web Site Fundraising Program," Business Wire, Nov. 8, 1999.*
Anon., "Unfinished Business," Sm@rt Partner, vol. 3, No. 23, p. 51, Jun. 19, 2000.*
Kotha, S., "Mass Customization: Implementing the Emerging Paradigm for Competitive Advantage," Strategic Management Journal, vol. 16, pp. 21–42 (1995).*
Kinney, S., "RIP Fixed Pricing: The Internet Is on Its Way to 'Marketizing' Everything," Business Economics, vol. 35, No. 2, pp. 39–44, Apr. 2000.*
AUS920010357, Brokering and Facilitating Consumer Projects in an E–Commerce System.

*Primary Examiner*—Nicholas D. Rosen
(74) *Attorney, Agent, or Firm*—Marilyn Smith Dawkins; Amy J. Pattillo

(57) ABSTRACT

A method, system and program for managing customization of projects prior to manufacture in an electronic commerce system is provided. An order system distributes a project offer to potential customers. A selection of potential customers return orders in response to the project offer, wherein each order includes customized selections by the customer. Manufacture of the project is then customized according to the order responses, such that a selection of potential customers control customization of a project.

35 Claims, 12 Drawing Sheets

U.S. PATENT DOCUMENTS

| | | | |
|---|---|---|---|
| 6,202,051 B1 | 3/2001 | Woolston | 705/27 |
| 6,269,343 B1 * | 7/2001 | Pallakoff | 705/26 |
| 6,295,513 B1 | 9/2001 | Thackston | 703/1 |
| 6,466,919 B1 * | 10/2002 | Walker et al. | 705/37 |
| 6,496,744 B1 * | 12/2002 | Cook | 700/95 |
| 6,594,642 B1 * | 7/2003 | Lemchen | 705/26 |
| 6,604,089 B1 * | 8/2003 | Van Horn et al. | 705/26 |
| 6,687,682 B1 | 2/2004 | Esfandiari et al. | 705/37 |
| 2001/0032166 A1 | 10/2001 | Ruffo et al. | 705/37 |
| 2002/0007333 A1 | 1/2002 | Scolnik et al. | 705/37 |
| 2002/0019761 A1 * | 2/2002 | Lidow | 705/10 |
| 2002/0065762 A1 | 5/2002 | Lee et al. | 705/37 |
| 2002/0107773 A1 * | 8/2002 | Abdou | 705/37 |
| 2002/0147674 A1 | 10/2002 | Gillman | 705/37 |
| 2002/0156857 A1 | 10/2002 | Brewer et al. | 709/206 |
| 2002/0165814 A1 | 11/2002 | Lee et al. | 705/37 |
| 2002/0169679 A1 * | 11/2002 | Neumayer | 705/26 |
| 2002/0188547 A1 | 12/2002 | Banerjee et al. | 705/37 |
| 2003/0033239 A1 | 2/2003 | Gilbert et al. | 705/37 |
| 2003/0208434 A1 | 11/2003 | Posner | 705/37 |
| 2004/0073507 A1 | 4/2004 | Scott et al. | 705/37 |
| 2004/0215467 A1 | 10/2004 | Coffman et al. | 705/1 |

* cited by examiner

PROJECT REQUEST — 150

| | |
|---|---|
| BUYER ID | BB11 |
| BUYER ADDRESS | BUY2@BUY2.COM |
| CATEGORIES OF MANUFACTURE | Printers |
| PROJECT NAME | World Season Calendar |
| UNITS | 20 |
| COST PER UNIT | $6 |
| INCLUDE GRAPHIC FILE — 152 | calendar.jpg |
| INCLUDE SPECIFICATION FILE — 154 | BUY2.COM/CALENDAR |

FIG. 4

MANUFACTURER AVAILABILITY — 170

| 172 | | 174 |
|---|---|---|
| [X] | MANUFACTURER A | Response URL |
| [ ] | MANUFACTURER B | Response URL |
| [ ] | MANUFACTURER C | Response URL |

SUBMIT ADJUSTED PROJECT REQUEST — 176

SECURE SELECTED MANUFACTURER — 178

| ORDER ID | PROJECT ID | CUSTOMER ID | CUSTOMER'S INSTRUCTIONS | ADJUSTABLE SELECTIONS |
|---|---|---|---|---|
| 001 | 000001A | CC001 | For a Size 0 head | RED |
| 002 | 000001B | CC001 | NONE | ENGLISH |
| 003 | 000001B | CC10 | Landscape Photos | JAPANESE |

| CUSTOMER ID | CUSTOMER NAME | CUSTOMER ADDRESS | EMAIL ADDRESS |
|---|---|---|---|
| CC001 | Jon Doe | 1 Doe Avenue | doe doe.om |
| CC10 | Jane Smith | 2 Smith Avenue | smith smith. om |

| PROJECT ID | PROJECT NAME | BUYER ID | CATEGORY | MFR ID | BUYER FILE URL | MFR FILE URL | STATUS |
|---|---|---|---|---|---|---|---|
| 000001A | Extra Large Headphones | AA11 | COMPUTERS; PERIPHERALS | 100 | BUY1.COM/HEAD | XXX.COM/HEADBID | Bid Placed |
| 000001A | Extra Large Headphones | AA11 | SMALL ELECTRONICS | 300 | BUY1.COM/HEAD | | Distributed To |
| 000001B | World Season Calendar | BB11 | PRINTING | 200 | BUY2.COM/CALENDAR | XXX.COM/CALENDARBID | Adjustment suggestions received |

| PROJECT ID | PROJECT NAME | MFR ID | BUYER ID | RESPONSE DUE DATE | DATE ARCHIVED | STATUS | OVERALL REQUIRE-MENTS | ADJUSTABLE SELECTIONS |
|---|---|---|---|---|---|---|---|---|
| 000001A | Extra Large Headphones | 100 | AA11 | 01/30/2004 | 01/01/2004 | TERMINATED - INSUFFICIENT UNITS ORDERED | MINIMUM OF 50 UNITS ORDERED | COLORS:<br>-RED<br>-GREEN<br>-YELLOW |
| 000001B | World Season Calendar | 200 | BB11 | 02/20/2004 | 01/20/2004 | BIDDING OPEN | MINIMUM OF 100 UNITS ORDERED AT $4 - $3 PER UNIT IF > 100 UNITS | LANGUAGES<br>-ENGLISH<br>-FRENCH<br>-JAPANESE |

| CUSTOMER ORDER REQUIREMENTS | PRODUCT CATEGORY | OTHER SEARCH CATEGORIES | SPECIFICATION URL |
|---|---|---|---|
| - MAXIMUM OF 25 UNITS - $25 PER UNIT | HEADPHONES | XXL, Listening | BUY1.COM/HEAD |
| - MAXIMUM OF 10 UNITS PER ORDER | CALENDAR | World, Seasonal | BUY2.COM/CALENDAR |

FIG. 14

| ORDER ID | PROJECT ID | CUSTOMER ID | CUSTOMER'S INSTRUCTIONS | ADJUSTABLE SELECTIONS |
|---|---|---|---|---|
| ZZ001 | 000001A | CC001 | For a Size 50 head | RED |
| ZZ002 | 000001B | CC001 | NONE | ENGLISH |
| ZZ003 | 000001B | CC104 | Landscape Photos | JAPANESE |

FIG. 15

| CUSTOMER ID | CUSTOMER NAME | CUSTOMER ADDRESS | EMAIL ADDRESS |
|---|---|---|---|
| CC001 | Jon Doe | 1 Doe Avenue | doe@doe.com |
| CC104 | Jane Smith | 2 Smith Avenue | smith@smith.com |

FIG. 16

MANAGING CUSTOMIZATION OF PROJECTS PRIOR TO MANUFACTURE IN AN ELECTRONIC COMMERCE SYSTEM

CROSS-REFERENCE TO RELATED APPLICATIONS

The present application is related to the following copending application, which are filed on even date herewith and incorporated herein by reference:

(1) U.S. patent application Ser. No. 09/875,864.

BACKGROUND OF THE INVENTION

1. Technical Field

The present invention relates in general to electronic commerce and, in particular, to purchasing projects prior to manufacture. Still more particularly, the present invention relates to customizing project manufacturing according to customer responses to a project offering prior to manufacture.

2. Description of the Related Art

In recent years, with the development of computer network technology, an electronic commerce (e-commerce) system has developed in which consumers and vendors are connected via a network. Electronic commerce can occur between a consumer and a vendor through, for example, an online information service, the Internet, a bulletin board system (BBS) or electronic data interchange (EDI).

There are many different methods in which e-commerce may be implemented as there are a vast variety of commodities and services in need of being traded. Many e-commerce systems operate on a post and match process; that is, the systems work by having a prospective consumer bid on an item and if the bid matches the vendors's specified selling price, the item is sold to that consumer. In another example, many e-commerce systems involve on-line auctions where vendors place products or services up for bid and consumers electronically place bids for purchasing the products or services; the item is sold to the consumer with the highest bid. In yet another example of an e-commerce system, vendors may offer a form for consumers to fill out for requesting a particular service, such as a mortgage lender application; the vendor compares the consumer information with pre-set lending qualifications and responds based on whether the consumer information meets the pre-set lending qualifications.

However, among the current e-commerce systems available, the vendor specified products being offered are already manufactured and the services are already specified. For example, the products placed up for bid in an on-line auction are already manufactured such that once the auction period has expired, the product is shipped to the consumer placing the highest bid. In addition, when a consumer fills out a mortgage lender application, the mortgage lenders providing the lending service have pre-set qualifying requirements for each consumer. Consumers are able to bargain hunt among existing product and service offerings, however, they are limited to those products and services that vendors have already determined to provide.

Some vendors do allow consumers to specify an order, however that specification is restrained to a product already offered by that vendor. For example, a vendor may offer a "customizable calendar" of a particular size and shape, where the consumer can select the text style of the calendar. However, allowing a consumer a couple of choices for a calendar specified by that vendor is no different than a vendor offering a couple of different color or size choices for a sweater. In both cases, the consumer is still limited to the product or service offered by the vendor.

In addition, another e-commerce model is a reverse bidding scheme where products that are already manufactured are placed up for order with the function that as the number of orders increases, the price decreases. However, reverse bidding also restrains the consumer in that consumers are ordering products that are completely specified by the vendor. The consumer only drives the price of the product, not the product itself.

Therefore, in view of the aforementioned, it would be advantageous to provide an e-commerce method, system and program that allows consumers to place orders for products and services where the consumer is enabled to specialize the product or service prior to manufacture. In particular, it would be advantageous to provide an e-commerce method, system and program for adjusting the manufacturing of a product or service according to consumer interest prior to the manufacture of the product or service.

SUMMARY OF THE INVENTION

In view of the foregoing, it is therefore an object of the present invention to provide an improved method, system and program for performing electronic commerce.

It is another object of the present invention to provide a method, system and program for purchasing projects prior to manufacture.

It is yet another object of the present invention to provide a method, system and program for customizing project manufacturing according to customer responses to a project offering prior to manufacture.

According to one aspect of the present invention, a project offer for a project is displayed to a customer prior to manufacture. In response to receiving a customized selection of the project offer by the customer, an order is placed for the project prior to manufacture, such that a customer controls the customization of a project prior to manufacture.

According to another aspect of the present invention, a project offer for a project is published to potential customers prior to manufacture. Multiple order responses are received from a selection of the potential customers. Manufacture of the project is then customized according to the order responses, such that a selection of potential customers control customization of a project.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a graphical representation of a project request entry in accordance with the method, system and program of the present invention;

FIG. 5 depicts a graphical representation of a manufacturer availability response received from the manufacturer broker system in accordance with the method, system and program of the present invention;

FIG. 8 illustrates a block diagram of a data storage structure for manufacturer information in accordance with the method, system and program of the present invention;

FIG. 9 depicts a block diagram of a data storage structure for buyer information in accordance with the method, system and program of the present invention;

FIG. 10 illustrates a block diagram of a data storage structure for current project requests in accordance with the method, system and program of the present invention;

FIG. 11 depicts a graphical representation of one embodiment of a project display to a customer in accordance with the method, system and program of the present invention;

FIG. 14 illustrates a block diagram of a data storage structure for project offers in accordance with the method, system and program of the present invention;

FIG. 15 depicts a block diagram of a data storage structure for logging orders from customers in accordance with the method, system and program of the present invention;

FIG. 16 illustrates a block diagram of a data storage structure for cataloguing customer registrations in accordance with the method, system and program of the present invention.

DETAILED DESCRIPTION OF THE PREFERRED EMBODIMENT

A method, system and program for procuring a manufacturer for a buyer project request and then customizing manufacture of the buyer project request according to customer orders is described. In the present invention, "buyer" preferably refers to the individual, group, organization, business or corporation submitting a project request. "Projects" preferably include both products and services before manufacture. "Project request" preferably refers to requests for manufacture of both products and services. "Manufacturer" preferably refers to the individual, group, organization, business or corporation that will bid on project requests and then manufacture the project request. "Customer" preferably refers to an individual, group, organization, business or corporation offering to purchase a project.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the computer system is a portable computing system such as a notebook computer, a palmtop computer, a personal digital assistant, a telephone or other electronic computing system that may also incorporate communications features that provide for telephony, enhanced telephony, messaging and information services. However, the computer system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
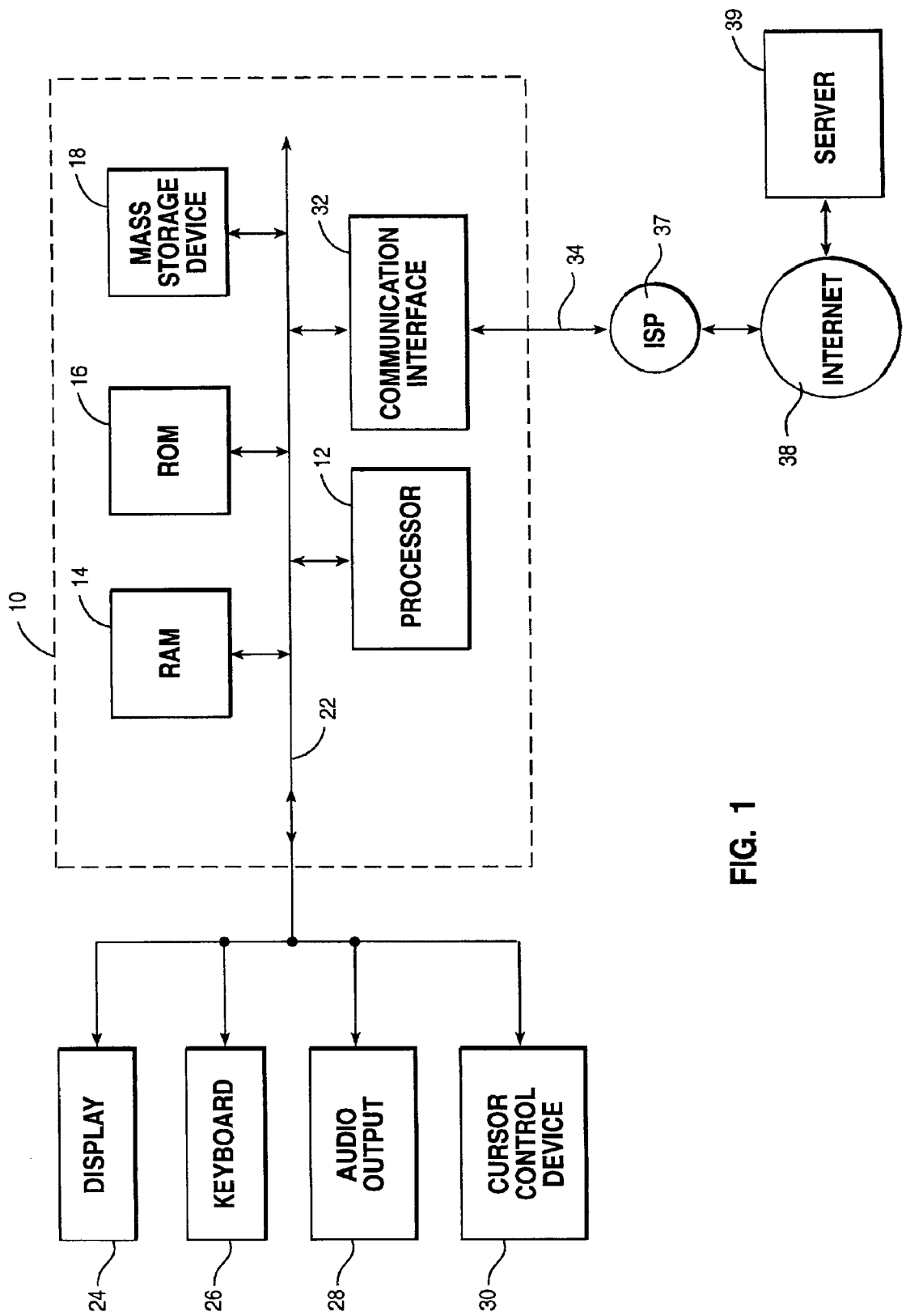
FIG. 1 depicts one embodiment of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 6, 7, 12, 13, 17 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 (e.g., a client) by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Figure 2:
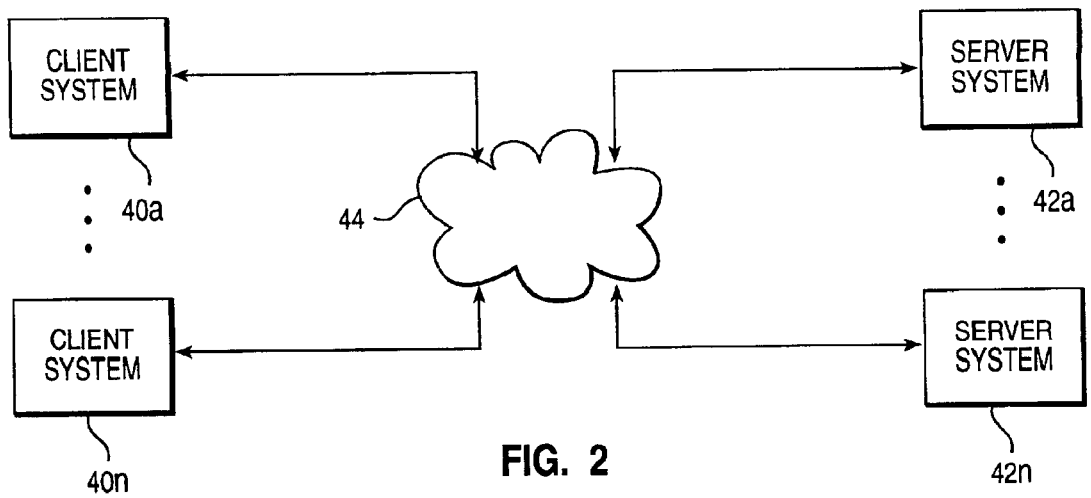
FIG. 2 illustrates a simplified block diagram of a client/server environment in which electronic commerce typically takes place in accordance with the method, system and program of the present invention.

With reference now to FIG. 2, there is depicted a simplified block diagram of a client/server environment in which electronic commerce typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on clients 40a–40n and render Web documents (pages) served by servers 42a–42n. Additionally, each of clients 40a–40n and servers 42a–42n may function as both a "client" and a "server" and may be implemented utilizing a computer system such as computer system 10 of FIG. 1.

The Web may refer to the total set of interlinked hypertext documents residing on servers all around the world. A network 44, such as the Internet, provides an infrastructure for transmitting these hypertext documents between clients 40a–40n and servers 42a–42n. Documents (pages) on the Web may be written in multiple languages, such as Hypertext Markup Language (HTML) or Extensible Markup Language (XML), and identified by Uniform Resource Locators (URLs) that specify the particular server 42a–42n and pathname by which a file can be accessed, and then transmitted from server 42a–42n to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Typically, servers 42a–42n coupled to network 44 respond to document requests and/or other queries from clients 40a–40n that are also coupled to network 44. In a traditional client/server exchange, a user from client 40a requests a document by entering a URL. In response, a Web browser executing from client 40a opens a connection server 42a via network 44 and initiates a request for the document. Servers 42a delivers the requested document, typically in the form of a text document coded in HTML to clients 40a.

Manufacturer Procurement and Order Specialization Overview

Figure 3:
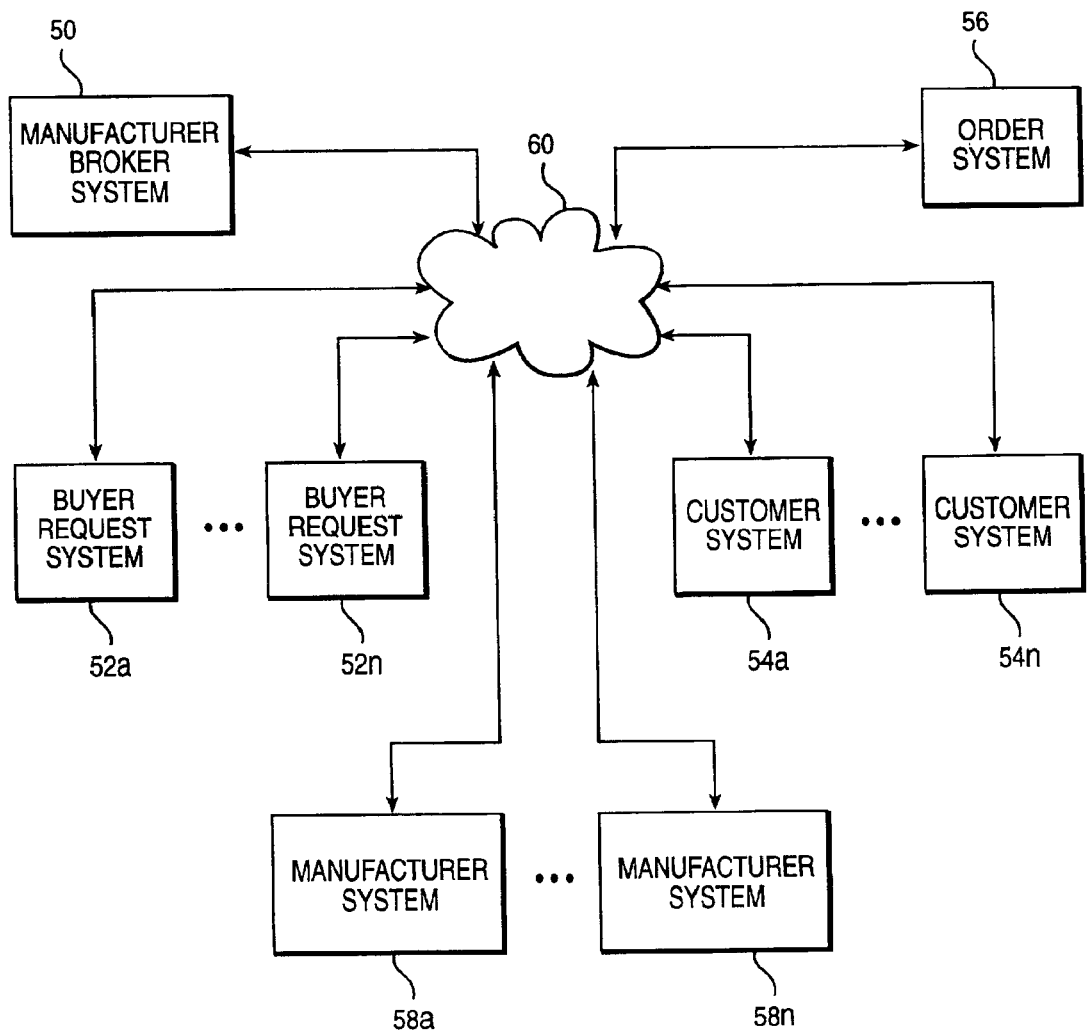
FIG. 3 depicts a block diagram of a preferred client/server environment for procuring a manufacturer for a specialized customer request and then further specifying manufacture according to customer orders according to the method, system and program of the present invention.

Referring now to FIG. 3, there is depicted a block diagram of a preferred client/server environment for procuring a manufacturer for a specialized customer request and then further specifying manufacture according to customer orders according to the method, system and program of the present invention. As illustrated, multiple buyer request systems 52a–52n are connected to network 60. Buyer request systems 52a–52n represent multiple client systems from which buyers may request access to a manufacturer broker system 50 via network 60. Manufacturer broker system 50 represents at least one server system which facilitates entry of project requests from buyer request systems 52 and then communicates with multiple manufacturer systems 58a–58n via network 60 to receive bids and procure a manufacturer for each project request. In particular, manufacturer systems 58a–58n may further communicate with each other or other subcontractors to bid out portions of a project request. In an alternate embodiment, manufacturer broker system 50 may be incorporated into buyer request systems 52a–52n or manufacturer systems 58a–58n.

According to one advantage of the present invention, a buyer may submit a project request via one of buyer request systems 52a–52n to be manufactured, but not need the number of units that would make manufacture of the project feasible. Therefore, advantageously a manufacturer can bid on a project request contingent on a number of units being ordered by the buyer and other customers. Also, advantageously, a buyer can obtain a manufacturer and customers for a project utilizing a single project request. Moreover, for a project that requires multiple manufacturers, a buyer can obtain the multiple manufacturers in different categories for a single project with a single project request.

Once a manufacturer is procured for a project request, manufacturer broker system 50 transmits the project request and manufacturer information to an order system 56. Order system 56 represents at least one server system which facilitates promotion of the project request to multiple customers with access to customer systems 54a–54n, processes customer orders received from customer systems 54a–54n and provides a specified order for the project request to the appropriate manufacturer system 58a–58n. In particular, customer systems 54a–54n represent multiple client systems from which customers, preferably other than the buyer can place customized orders for a project request. In the present invention, although depicted as independent systems, manufacturer broker system 50 and order system 56 may be integrated into a single server or group of servers.

According to another advantage of the present invention, a customer can access project offers from multiple diverse categories at a single interface. In addition, advantageously, customers can drive the market for which goods are actually manufactured according to customer interest. Moreover, a customer can further specialize projects before manufacturer, such that customer interest drives what projects are manufactured.

The present invention is preferably utilized for projects prior to manufacture such that buyers and customers control what projects actually reach the marketplace. However, the present invention may be utilized for projects that represent products or services that were once manufactured, but are no longer available. For example, if a manufacturer discontinues a line of products, a buyer may submit a project request for that line of products to be manufactured again. The same manufacturer or a new manufacturer may be procured to manufacture the line of products. Then customer orders of the product line will indicate whether manufacture is feasible.

In an alternate embodiment of the present invention, manufacturers may utilize manufacturer systems 58a–58n to submit project requests to manufacturer broker system 50 or directly to order system 56, such that manufacturers can determine the feasibility of a project, specialize the project according to customer interest and obtain orders from the project prior to manufacture of the project.

Buyer Project Request Process

With reference now to FIG. 4, there is illustrated a graphical representation of a project request entry in accordance with the method, system and program of the present invention. As depicted, graphical display window 150 includes a buyer identification (ID), buyer email address, selected categories of manufacture, a project name, a range of units requested, and a range of cost per unit.

In particular, the project request may be for a product, a service, or a combination of products and services. In addition, the project request may require a single manufacturer or multiple manufacturers to complete the project.

Preferably, buyers register personal information with the manufacturer broker system and are assigned a buyer ID. Then, for each project request, buyers select from multiple categories of manufacture that are associated with the project. A pull down list, pop-up window list or other graphical function may be utilized to provide a list of available categories of manufacture to the buyer. Buyers may select a single or multiple categories of manufacture. In addition, categories of manufacture may include selectable subcategories. Moreover, a buyer may designate particular manufacturers according to the manufacturer ID or name.

The buyer preferably designates the number of units desired and the cost per unit. The buyer may select ranges of units and cost per unit as well as setting a minimum, maximum, medium, or other limit. In addition, the buyer may designate the number of units and desired cost per unit based on variations of the project being requested. For example, the buyer may set one price per unit based on using a metal material and a second price per unit based on using a plastic material where the project specification contains variables.

In addition, graphical display window 150 includes selectable buttons 152 and 154 which when selected allow the buyer to search a directory to designate a graphic file and specification file for the project request. The graphic file included in the project request may include, but is not limited to including, 3-D graphical models, graphical labels, text documents, and other graphic and text files that facilitate a manufacturer in determining a bid for the project request and then producing the project request. The specification file included in the project request may include a web address at which a description of the requested project is available for both manufacturers and prospective customers. The web accessible specification file may also include, for example, 3-D graphical models, project specifications, graphical representations of the project and textual information.

In the present example, a buyer is requesting a "world season calendar" that is specified by the graphic file "calendar.jpg" and the specification file located at "buy 2.com/calendar". The calendar specifications may include a particular size of calendar that allows for showing the seasons on each continent for each month. Such a calendar might be particularly advantageous to a traveler who can quickly view the season on the calendar when planning travel. In the example, the buyer is requesting 20 to 30 units at a range of $6 to $7 per calendar. However, as will be further described, a manufacturer may bid on producing 100 units of the calendar to reach that price range or may propose a higher price for the number of units requested.

As an additional feature, the buyer may select the level of security that should be applied to the project request. For example, the buyer may elect to allow any other registered buyer to view the current project request. Alternatively, the buyer may elect to secure the project request and require non-disclosure agreements to be signed by any manufacturer that the project request is sent to. In another example, the buyer may indicate that if other buyers submit similar project requests, then those buyers may view the current project request. Also, available security features may adjust automatically according to the type of project request or the buyer may designate when registering to always apply a particular minimum or maximum level of security to every project request for that buyer.

Referring now to FIG. 5, there is illustrated a graphical representation of a manufacturer availability response received from the manufacturer broker system in accordance with the method, system and program of the present invention. As depicted, graphical display window 170 includes multiple available manufacturers who have placed bids for the project request. Selectable buttons 174 each represent a "selectable URL" at which the details of each manufacturer's bid or suggestions for adjusting the project request can be viewed. The buyer can select from among the manufacturer's bids using one of selectable buttons 172. In addition, the buyer may select a submit adjusted project request button 176 in order to adjust the current project request. As will be further described, manufacturers may bid on the project request as is, submit bids based on alterations to the project request made by the manufacturer, or provide the buyer with suggestions on how to adjust the project request for feasability. Alternatively, the buyer may select a secure selected manufacturer button 178 which initiates transmittal of the manufacturer selected by the buyer to the manufacturer broker system.

In addition, preferably in another embodiment a buyer can select multiple manufacturers for manufacturing a project where the project requires multiple parts or where the buyer prefers to keep at least one manufacturer on stand-by in case the first manufacturer selected is unable to manufacture. In that case, a buyer may rate manufacturers according to first pick, second pick, etc. In addition, a buyer may allow for multiple manufacturers to manufacture the same project where, for example, the distribution areas of each manufacturer differ such that the buyer is able to maximize expansion of the project.

Figure 6:
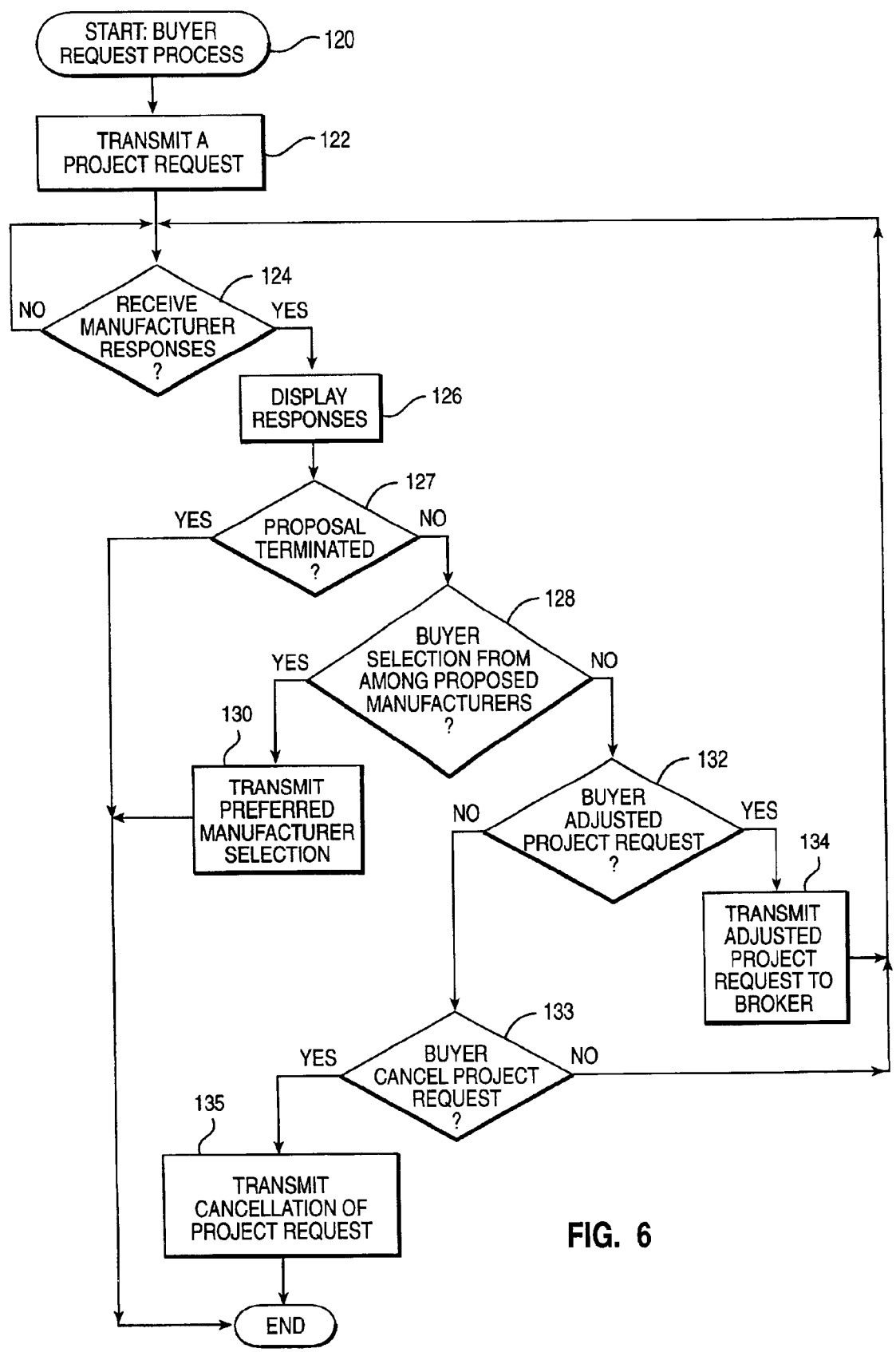
FIG. 6 illustrates a high level logic flowchart of a process and program for facilitating a buyer project request in accordance with the method, system and program of the present invention.

With reference now to FIG. 6, there is depicted a high level logic flowchart of a process and program for facilitating a buyer project request in accordance with the method, system and program of the present invention. As illustrated, the process starts at block 120 and thereafter passes to block 122. In the present embodiment, the process illustrated is being performed by the buyer request systems, however in alternate embodiments, the process illustrated may be performed by other client systems and may include alternate steps than those depicted.

Block 122 illustrates transmitting a project request to the manufacturer broker system. The project request may include, but is not limited to, the information described in FIG. 4. Next, block 124 depicts a determination as to whether or not manufacturer feasibility responses have been received from the manufacturer broker system. Manufacturer feasibility responses may include, but are not limited to, a bid for manufacturing the project request, a suggestion for adjusting the project request, or a termination of the pending project request. If no manufacturer feasibility responses have been received, then the process iterates at block 124. If manufacturer feasibility responses have been received, then the process passes to block 126. Block 126 illustrates displaying the feasibility responses to the buyer, such as in FIG. 5, and the process passes to block 127. Alternatively, the responses may be output to the buyer via other media and in other formats.

Block 127 depicts a determination as to whether the response is a project request termination. If the response is a project request termination, then the process ends. If the response is not a project request termination, then the process passes to block 128.

Block 128 illustrates a determination as to whether or not a buyer selection has been made from among any manufacturers submitting bids. If no buyer selection from among any manufacturers submitting bids has been made then the process passes to block 132. However, if a buyer selection from among any manufacturers submitting bids has been made, then the process passes to block 130. Block 130 depicts transmitting the buyer's selection from among the proposed manufacturers to the broker system and the process ends.

Block 132 depicts a determination as to whether or not a buyer has adjusted the project request. If the buyer has not changed the project request, then the process passes to block 133. If the buyer has changed the project request, then the process passes to block 134. Block 134 illustrates transmitting the buyer's updated project request to the manufacturer broker system and the process passes to block 124.

Block 133 illustrates a determination as to whether or not the buyer has canceled the project request. If the buyer has not canceled the project request, then the process passes to block 124. If the buyer has canceled the project request then the process passes to block 135. Block 135 depicts transmitting a project request cancellation to the manufacturer broker system and the process ends.

Manufacturer Brokering Process

Figure 7:
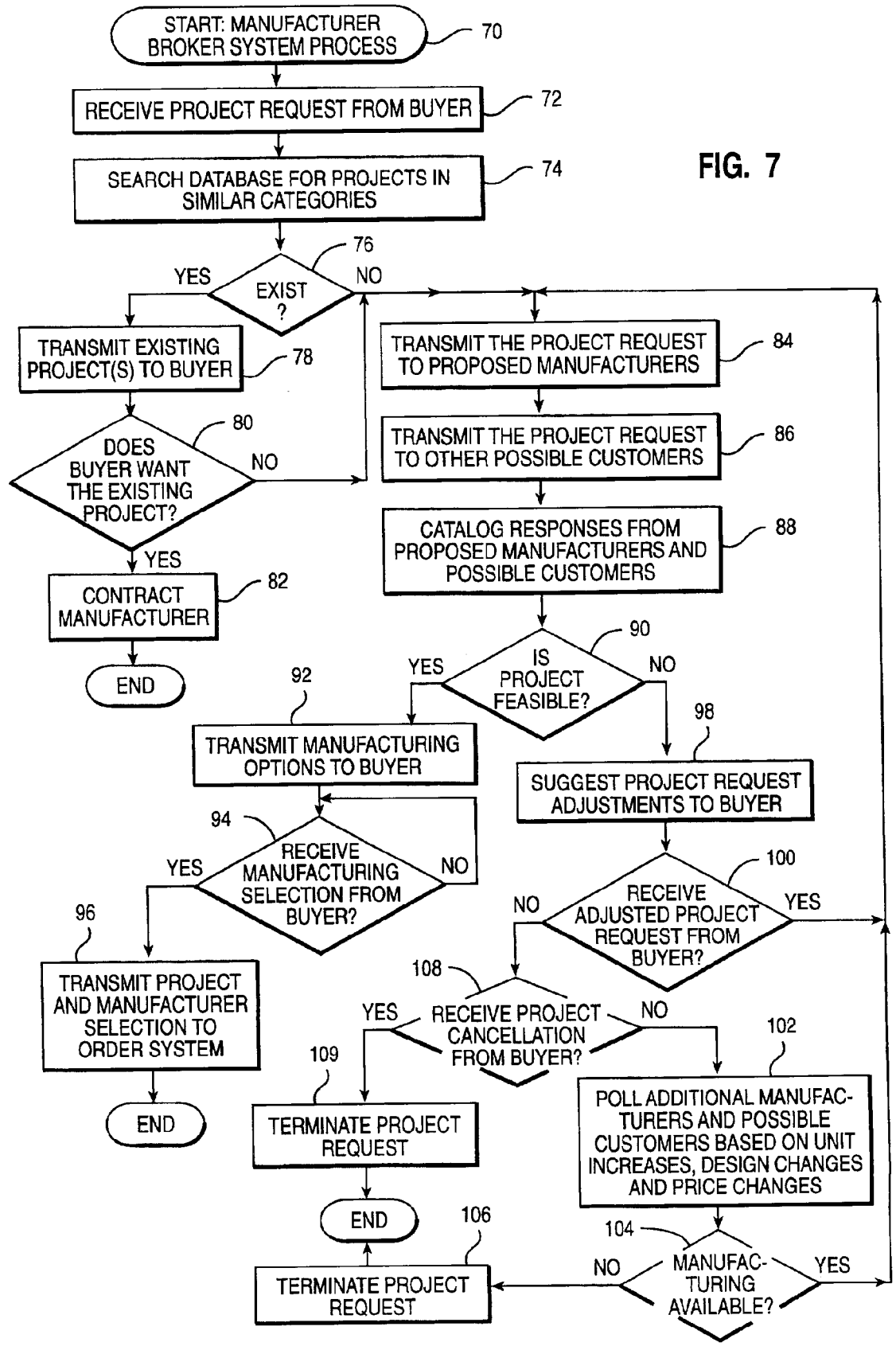
FIG. 7 depicts a high level logic flowchart of a process and program for procuring a manufacturer for a buyer project request in accordance with the method, system and program of the present invention.

Referring now to FIG. 7, there is depicted a high level logic flowchart of a process and program for procuring a manufacturer for a buyer project request in accordance with the method, system and program of the present invention. As depicted, the process starts at block 70 and thereafter proceeds to block 72. In the present embodiment, the process illustrated is being performed by the manufacturer broker system, however in alternate embodiments, the process illustrated may be performed by other servers and may include alternate steps than those depicted.

Block 72 depicts receiving a project request from a buyer. Next, block 74 illustrates searching a database of current project requests for projects in similar categories. In particular, the current project requests may include, but are not limited to, requests that are in the process of being approved, approved project requests and projects in the process of being manufactured or previously manufactured.

Thereafter, block 76 depicts a determination as to whether or not the project request or a similar project already exists in the database. If the project request or a similar project does not already exist in the database, the process passes to block 84. If the project request or a similar project already exists in the database, the process passes to block 78.

Block 78 illustrates transmitting the existing project request description to the buyer if the security for the existing project request allows. Next, block 80 depicts a determination as to whether or not the buyer selects the existing project. If the buyer selects the existing project, the process passes to block 82 where the manufacturer is contacted with the request and the process ends. Alternatively, the buyer's project request may be transmitted to the order system to be processed as will be further described. Otherwise, if the buyer does not select the existing project, the process passes to block 84.

Block 84 depicts filtering and transmitting the project request to relevant manufacturers. In particular, each manufacturer is registered according to categories of projects such that project requests are filtered and transmitted according to project categories set by the buyer and also determined by the manufacturer broker system. In addition, relevant manufacturers may be determined by analysis of the project request, manufacturer history, buyer history and other historical information utilized by the manufacturer broker system or persons employed to determine relevant manufacturers for project requests.

Next, block 86 illustrates transmitting the project request to other possible customers. A database of customers interested in certain categories of projects and subcategories thereof may be maintained such that customers can be polled for interest in project request. Polling is preferably dependent upon buyer designation of security for the project request. Thereafter, block 88 depicts cataloging responses from relevant manufacturers and possible customers.

Next, block 90 illustrates a determination as to whether or not a project is feasible. At this initial stage, project feasibility may be determined by whether manufacturers have placed bids for the project request or not and any customer feedback received. In particular, manufacturer bids may include cut-off points where the price per unit changes, minimum unit orders, maximum unit orders, types of customization available, and other criteria. If the project is not feasible, then the process passes to block 98. If the project is feasible, then the process passes to block 92.

Block 92 depicts transmitting manufacturing availability options to the buyer. Next, block 94 illustrates a determination as to whether or not a manufacturer selection has been received from the buyer. If a manufacturer selection has not been received, the process iterates at block 94. If a manufacturer selection has been received, the process passes to block 96. Block 96 depicts transmitting the project request and manufacturer selection to the order system and the process ends.

Block 98 illustrates suggesting project request adjustments to the buyer when the project request is not feasible. Suggested adjustments may be received from the manufacturers or may be determined by the manufacturer broker system based on historical feasibility data compiled for each project request. For example, a manufacturer may not be willing to bid on the current project request, but would be willing to bid on the project request if the unit price was increased or if the number of units was increased. Or, for example, a manufacturer may want information about the number of potential customers for the project request, before bidding on the project request. Alternatively, the manufacturer broker system may recommend adjustments that historically have aided in increasing feasibility such as increasing the number of units, changing materials, changing manufacture schedule time, etc.

Next, block 100 depicts a determination as to whether or not project request adjustments are received from the buyer. If project request adjustments are received from the buyer then the bid procurement stage starts again at block 84. If project request adjustments are not received from the buyer then the process passes to block 108.

Block 108 illustrates a determination as to whether or not a project request cancellation is received from the buyer. If a project request cancellation is not received from the buyer, then the process passes to block 102. If a project request cancellation is received from the buyer, then the process passes to block 109. Block 109 depicts terminating the project request and the process ends.

Block 102 depicts polling additional manufacturers and possible customers based on unit increases, design changes and price changes that have been suggested by the manufacturers or determined by the manufacturer broker system. Next, block 104 illustrates a determination as to whether or not manufacturing is available. If there is a lack of manufacturers willing to place bids on the project and/or a lack of possible customer interest, then manufacturing may be unavailable for the project request. Additionally, after a particular amount of time, the bidding process may automatically terminate. If manufacturing is available, the process passes to block 84 where the broker system utilizes the polled information to adjust the project request and attempt to solicit bids. If manufacturing is not available, then the process passes to block 106 where the project request is terminated and the process ends.

With reference now to FIG. 8, there is depicted a block diagram of a data storage structure for manufacturer information in accordance with the method, system and program of the present invention. As illustrated, the data corresponding to manufacturer registration information is preferably stored in a data storage structure such as database table 180. The example database table 180 is provided in order to depict a selection of fields 182 which may be included in a data storage structure. Fields 182 include a manufacturer identification (ID), a manufacturer name, a manufacturer (MFR) address, the main categories of projects for that manufacturer, an email address, a web site address, and a rating. For example, a registered manufacturer with MFR ID "100" is named "XXX Inc." and manufactures projects in the categories of computers and a subcategory of peripherals for computers. In addition, although not depicted, an activity history for each manufacturer may be stored according to manufacturer ID. In alternate embodiments, alternate selections for manufacture field information may be included. In addition, alternate types of data storage structures and methods may be utilized.

Preferably a rating system is provided to store references provided by buyers, customers, and other manufacturers. In particular, manufacturers are preferably specifically rated by the manufacturer, buyers, customers, and other manufacturers in multiple categories. For example, manufacturer "XXX INC" has been rated "1, 5, 2" corresponding to three rating categories. For example, rating categories may include, bid accuracy, reliability, stability, quality, size, growth, and other categories that aid buyers, customers and other manufacturers in selecting a manufacturer.

Referring now to FIG. 9, there is illustrated a block diagram of a data storage structure for buyer information in accordance with the method, system and program of the present invention. As depicted, the data corresponding to buyer registration information is preferably stored in a database storage structure such as database table 190. The example database table 190 is provided in order to depict a selection of fields 192 which may be included in a data storage structure. Fields 192 include a buyer ID, a buyer name, a buyer address, an email address, a web site address, and a rating system. For example, the registered buyer with buyer ID "AA11" is named "buy1" and has a web site "buy1.com". In addition, although not depicted, an activity history for each buyer may be stored according to buyer ID. In an alternate embodiment, alternate selections for buyer field information may be included. In addition, alternate types of data storage structures and methods may be utilized.

Preferably a rating system is provided to store references provided by the current buyer, customers, manufacturers, and other buyers. In particular, buyers are preferably specifically rated by the manufacturer, buyers, and customers in multiple categories. For example, buyer "AA11" has been rated "1, 1, 1" corresponding to three rating categories. For example, rating categories may include, project request accuracy, reliability, stability, quality, size, growth, and other categories that aid buyers, customers and other manufacturers in responding to a buyer.

With reference now to FIG. 10, there is depicted a block diagram of a data storage structure for current project requests in accordance with the method, system and program of the present invention. As illustrated, the data corresponding to current project requests is preferably stored in a data storage structure such as database table 200. The example database table 200 is provided in order to depict a selection of fields 202 which may be included in a data storage structure. Fields 202 include a project ID, a project name, a buyer ID, a manufacturing category, a MFR ID, a buyer file URL, a MFR File URL and the status of the project proposal. The buyer ID and MFR ID reference the manufacturer table and the buyer table in FIGS. 8 and 9. In the present embodiment, each manufacturer to which the project request is distributed and each manufacturer response to each project request is cataloged. Then, once at least one manufacturer places a bid on the project request and the buyer selects a manufacturer, the entry for the project request according to the selected manufacturer is transmitted to the order system. In alternate embodiments, alternate selections for project proposal field information may be included. In addition, alternate types of data storage structures and methods may be utilized.

In the example, a project named "extra large headphones" was distributed to both MFR ID "100" and "300" since both manufacture in categories associated with headphones and a bid has been placed on the project by MFR ID "100". In addition, the project "world season calendar" was distributed to MFR ID "200" and suggestions for adjusting the project request have been received. Such suggestions are preferably accessible at the MFR URL file "YYY.com/calendarbid".

In an alternate embodiment, each manufacturer may access portions of project request feasibility responses included in database table 200 in order to monitor other manufacturer's bids, monitor the status of the project request, collaborate with other manufacturers and other actions that are valuable during the bidding process. Allowing each manufacturer to view the status of project request feasibility responses is preferably customizable according to security preferences of the buyer and each manufacturer responding to the project request.

Customer Order Placement Process

Referring now to FIG. 11, there is depicted a graphical representation of one embodiment of a project display to a customer in accordance with the method, system and program of the present invention. As depicted, graphical display window 260 includes a display area 262 for information referenced from the buyer specification file for the project request. Next, graphical display window 260 includes an entry area 261 for a customer ID. Preferably, customers register with the order server, as will be further described, such that a customer ID can be used to reference the customer's financial and shipping information.

Next, graphical display window 260 includes requirements, adjustable selections and special instructions 264. The requirements for the project may be set, for example, by the manufacturer or the buyer in order to ensure certain constraints. For example, there may be a required number of units per order. Adjustable selections may be pre-designated selections or customer defined. For example, a customer may select from three different pre-designated sizes for a particular project. Or, for example, a customer defined number of units for the order. Special instruction requests may include, for example, requesting a size of a project that is not offered.

Once a customer has specified an order, selection of a place order button 266 will initiate transmission of the order to the order system. In particular, a customer may designate that the order is contingent upon the adjustable selections and/or special instructions being available. For example, if a user places an order for a sweater with a special instruction requesting a size not offered, the customer may indicate that placement of the order is contingent upon that special size request being available. In another example, a customer may place an order for a product contingent on the product being available for a particular price.

Figure 12:
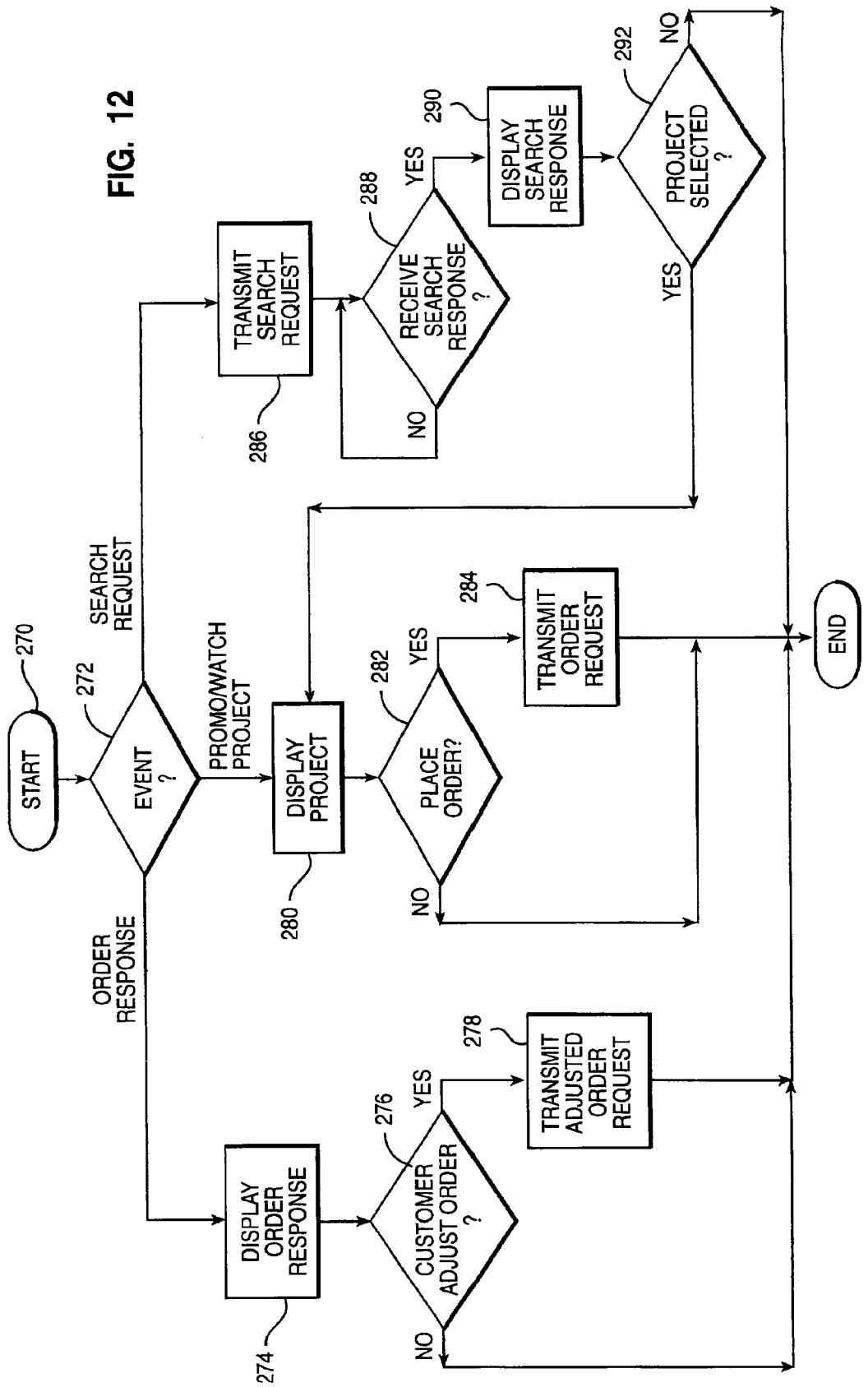
FIG. 12 illustrates a high level logic flowchart of a process and program for managing customer order placement in accordance with the method, system and program of the present invention.

With reference now to FIG. 12, there is illustrated a high level logic flowchart of a process and program for managing customer order placement in accordance with the method, system and program of the present invention. As depicted, the process starts at block 270 and thereafter proceeds to block 272. In the present embodiment, the process illustrated is preferably being performed by the customer system, however in alternate embodiments, the process illustrated may be performed by other server systems and may include alternate steps than those depicted.

Block 272 depicts a determination as to which event has occurred. If an order response has been received, then the process passes to block 274. If a promotional or watch request project has been received, then the process passes to block 280. Alternatively, if a search request has been received, then the process passes to block 286.

Block 274 illustrates displaying an order response. An order response may include a verification that the order has been placed, a verification that the order will be manufactured and the expected shipping date, a request for an adjustment to the order, or a cancellation of the order. Requests for adjustments to orders may arise when a customer includes a special instruction that a manufacturer will not handle. Next, block 276 depicts a determination as to whether or not the customer adjusted the order if requested to do so. If the customer adjusts the order then the adjusted order request is transmitted as illustrated in block 278, replacing the previous order request and the process ends. Otherwise if the customer does not adjust the order request or was not requested to do so, the process ends.

Block 280 depicts displaying the project. In particular, a customer may designate a particular category or subcategory to watch for new projects. The customer then receives information about new projects in those selected categories through electronic mail, cookies or other forms of transmitting project offers based on preferences. In addition, the order system may send promotional information for new projects. The project may be displayed in a manner including, but not limited to, that depicted in FIG. 11. Next, block 282 illustrates a determination as to whether or not the customer has selected to place an order for the project. If the customer has not placed an order, then the process ends. If the customer has selected to place an order, then the process passes to block 284. Block 284 depicts transmitting the order request to the order system and the process ends.

Block 286 illustrates transmitting a search request to the order system. A customer may submit a search request for projects based on categories, subcategories or other search information entered by the customer. Next, block 288 depicts a determination as to whether a search response has been received. If a search response has not been received, the process iterates at block 288 for a designated amount of time before an error stops the process. If a search response has been received, then the process passes to block 290. Block 290 illustrates displaying the search response. The search response may be displayed, for example, in a list of project names including graphical images representing each project. Next, block 292 depicts a determination as to whether or not a project has been selected from the list. If a project is not selected, then the process ends. If a project is selected, then the process passes to block 280 where the selected project is displayed.

Order Management Process

Figure 13:
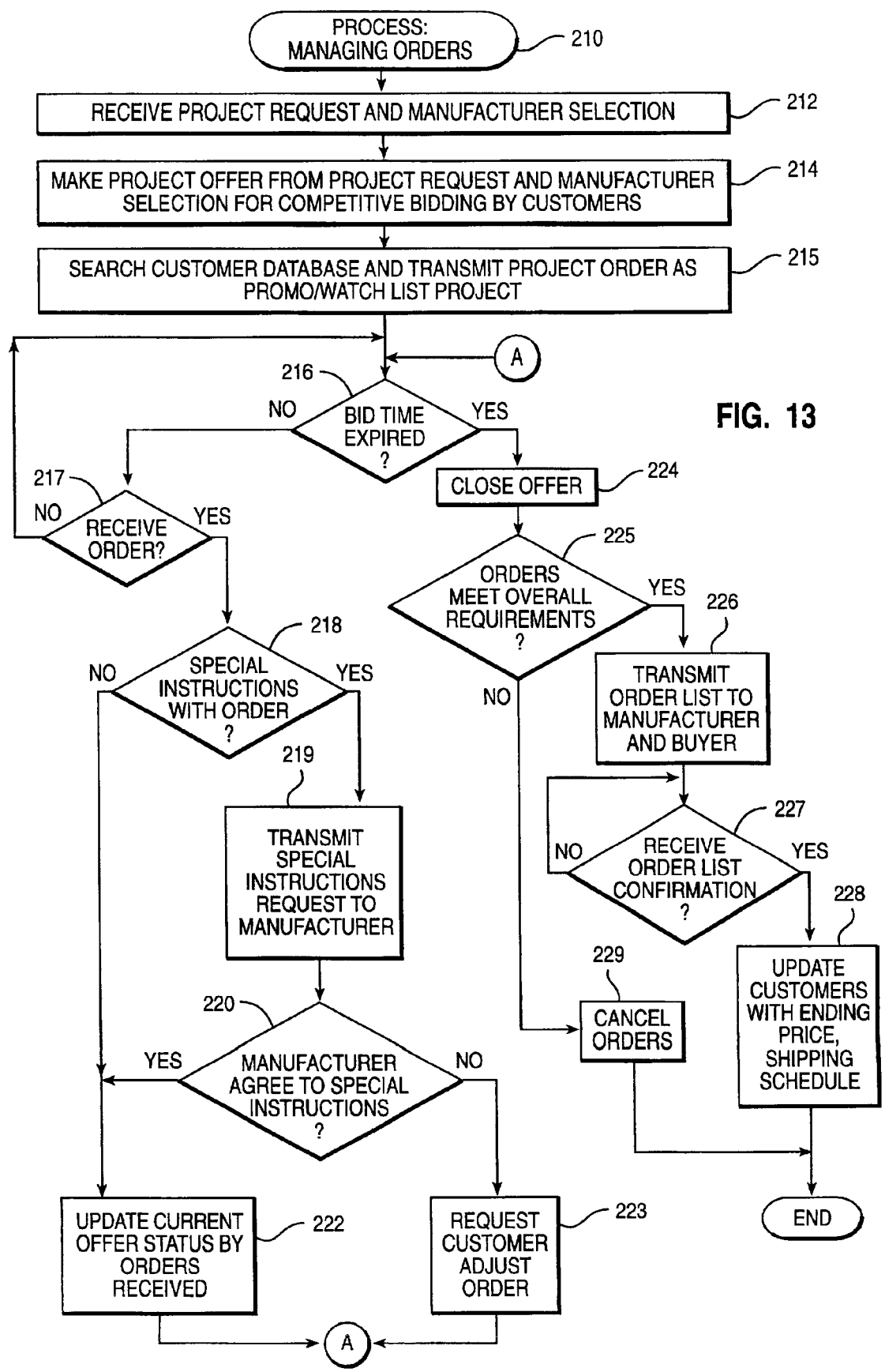
FIG. 13 depicts a high level logic flowchart of a process and program for managing pre-manufacture orders in accordance with the method, system and program of the present invention.

Referring now to FIG. 13, there is illustrated a high level logic flowchart of a process and program for managing pre-manufacture orders in accordance with the present invention. As illustrated, the process starts at block 210 and thereafter passes to block 212. In the present embodiment, the process illustrated is being performed by the order server, however in alternate embodiments, the process illustrated may be performed by other server systems and may include alternate steps than those depicted.

Block 212 depicts receiving a project request and manufacturer selection from the manufacturer broker system. Next, block 214 illustrates making a project offer from the project request and manufacturer selection for competitive bidding by customers and the process passes to block 215. In particular, the project offer may include information such as the price range according to number of units ordered, the manufacturer, the buyer, the bid time and searchable project categories. In addition when the project offer is compiled, specifications given by the manufacturer and/or buyer may control the required information, adjustable selections and range of special instructions. For example, the manufacturer bid may include cut-off points where the price per unit changes, minimum unit orders, maximum unit orders, types of customization available, and other criteria utilized by the order system to compile the project offer.

Block 215 depicts searching a customer database for customers interested in the project category and transmitting the project offer in a customer specified format to those customers. The customer specified format may include, for example, an electronic mail (e-mail) notification. In addition, the buyer or manufacturer may pay a fee to have the project offer transmitted as a promotion to particular groups of customers. Alternatively, a customer may pro-actively initiate a search in a particular category which includes the project offer.

Next, block 216 illustrates a determination as to whether or not the bid time has expired. Preferably a time period for orders to be received is determined for each project offer. If the bid time has expired, the process passes to block 224. If the bid time has not expired, the process passes to block 217. Block 217 depicts a determination as to whether or not an order has been received. If an order has not been received, then the process passes to block 216. If an order has been received, then the process passes to block 218.

Block 218 depicts a determination as to whether or not special instructions are received with an order. In particular, each order is essentially a bid for the pre-manufacturer project because each customer may further specialize the project with additional specifications. If special instructions are not received with an order, then the process passes to block 222. If special instructions are received with an order, then the process passes to block 219. Block 219 illustrates transmitting the special instructions request to the manufacturer. Next, block 220 depicts a determination as to whether or not the manufacturer has agreed to the special instructions. If the manufacturer agrees to the special instructions, then the process passes to block 222. If the manufacturer does not agree to the special instructions, then the process passes to block 223. Block 223 illustrates requesting that the customer adjust the order and the process passes to block 216.

Block 222 illustrates updating the current offer status by orders received. In updating the current offer, the price per unit, minimum unit order, and other factors based on the overall requirements may be updated.

Block 224 depicts closing the offer when the bid time has expired. Next, block 225 illustrates a determination as to whether or not the customer orders meet the overall project requirements. For example, if the manufacturer set a minimum of 40 orders and only 15 were received, then the customer orders would not meet the overall project requirements. In addition, in determining whether the customer orders meet the overall project requirements, individual project orders are analyzed to determine if the contingent selections for each individual project order are met. For example, if a customer places an order contingent on a particular closing price and the price did not close at that particular price, then that customer order does not meet the overall project requirements either. Individual project orders with contingent selections that are not met after closing the offer are cancelled and the customer is notified.

If the customer orders meet the overall project requirements, then the process passes to block 226. If the customer orders do not meet the overall project requirements, then the process passes to block 229. Block 229 depicts cancelling all the orders and the process ends. In cancelling the orders, preferably any customer, the buyer and the manufacturer are notified that the orders did not meet the overall project requirements.

Next, block 226 illustrates transmitting the catalogued list of customer orders to the manufacturer and the buyer. Thereafter, block 227 depicts a determination as to whether or not an order list confirmation has been received. If an order list confirmation has not been received, then the process iterates at block 227. Otherwise, once an order list confirmation is received, the process passes to block 228. Block 224 depicts updating customers with the ending price, charging the customer account and providing an expected shipping schedule according to information received with the order confirmation and the process ends. Alternatively, the order list confirmation may designate particular orders that will not be filled or that no orders will be filled. Unless the manufacturer otherwise indicates in the project offer, the manufacturer can choose whether or not to manufacture and which orders in particular to manufacture.

In particular, the ending price for each customer may vary based on number of units ordered, frequency of purchases, special instructions with orders and other factors that may effect an end price of a specialized project. In addition, the manufacturer may adjust the price per unit for each customer based on the purchase history or purchase volume of that customer with the manufacturer such that the manufacturer can offer discounts to loyal or high volume customers.

With reference now to FIG. 14, there is depicted a block diagram of a data storage structure for project offers in accordance with the method, system and program of the present invention. As illustrated, the data corresponding to project offers is preferably stored in a data storage structure such as database table 230. The example database table 230 is provided in order to depict a selection of fields 232 which may be included in a data storage structure. Fields 232 include the project ID, project name, MFR ID, buyer ID, response due date, data archived, status, overall order requirements, customer order requirements, adjustable selections, project category, other searchable categories and specification URL. In an alternate embodiments, alternate selections for project offers may be included. In addition, alternate types of data storage structures and methods may be utilized.

For example, the overall order requirements indicate a minimum number of units that must be ordered in order to manufacture, price adjustments according to the number of units ordered, adjustable selections and other information that is set to determine whether any of the orders will be fulfilled. The customer order requirements are order requirements of each individual customer including, but not limited to, the design specification for a project, the minimum number of units that must be ordered, materials available for the project and other specifications that are required for each customer order. The adjustable selections are preferably variables that each customer can designate or select from such as the number of units in the order, colors, sizes, shapes, and other variables of a project that the manufacturer is willing to adjust.

Referring now to FIG. 15, there is illustrated a block diagram of a data storage structure for logging orders from customers in accordance with the method, system and program of the present invention. As illustrated, the data corresponding to customer order information is preferably stored in a data storage structure such as database table 240. The example database table 240 is provided in order to depict a selection of fields 242 which may be included in a data storage structure. Fields 242 include, but are not limited to, an order ID, a project ID, a customer ID, customer instructions, adjustable selections, and status. The customer ID references the customer table in FIG. 16, as will be further described. In alternate embodiments, alternate selections for customer order field information may be included. In addition, alternate types of data storage structures and methods may be utilized.

In the example depicted, an order placed for the "extra large headphones" includes a special instruction for a particular sized head. A manufacturer may determine to manufacture a set of headphones specifically for that size of head, or may decline to perform the special instruction. Additionally, a manufacturer may decide to add the special instruction as an adjustable selection for the project offer. In another entry, an order for a "world season calendar" includes a request for landscape photos to be included.

With reference now to FIG. 16, there is depicted a block diagram of a data storage structure for cataloguing customer registrations in accordance with the method, system and program of the present invention. As illustrated, the data corresponding to customer personal information is preferably stored in a data storage structure such as database table 250. The example database table 250 is provided in order to depict a selection of fields 252 which may be included in a data storage structure. Fields 252 include, but are not limited to, a customer ID, a customer name, a customer address, an email address, financial information and project category preferences. In addition, although not depicted in the present embodiment, fields 252 may include information such as references for the customer, acknowledgment of a non-repudiation agreement, customer order history and specific requests by the customer. Moreover, alternate types of data storage structures and methods may be utilized.

It is particularly advantageous that customers can place orders for pre-manufacture projects requested by multiple independent buyers to be manufactured by multiple independent manufacturers without having to re-enter financial information for each order at separate web sites since customers are registered with the order server for all available projects as illustrated in FIG. 16. In addition, it is particularly advantageous that customers can view the status of orders placed with multiple independent manufacturers through a single data request to the order server since the data structure of FIG. 15 can be searched according to customer ID and status information for each customer order obtained in a single transaction.

Manufacturer Context

Figure 17:
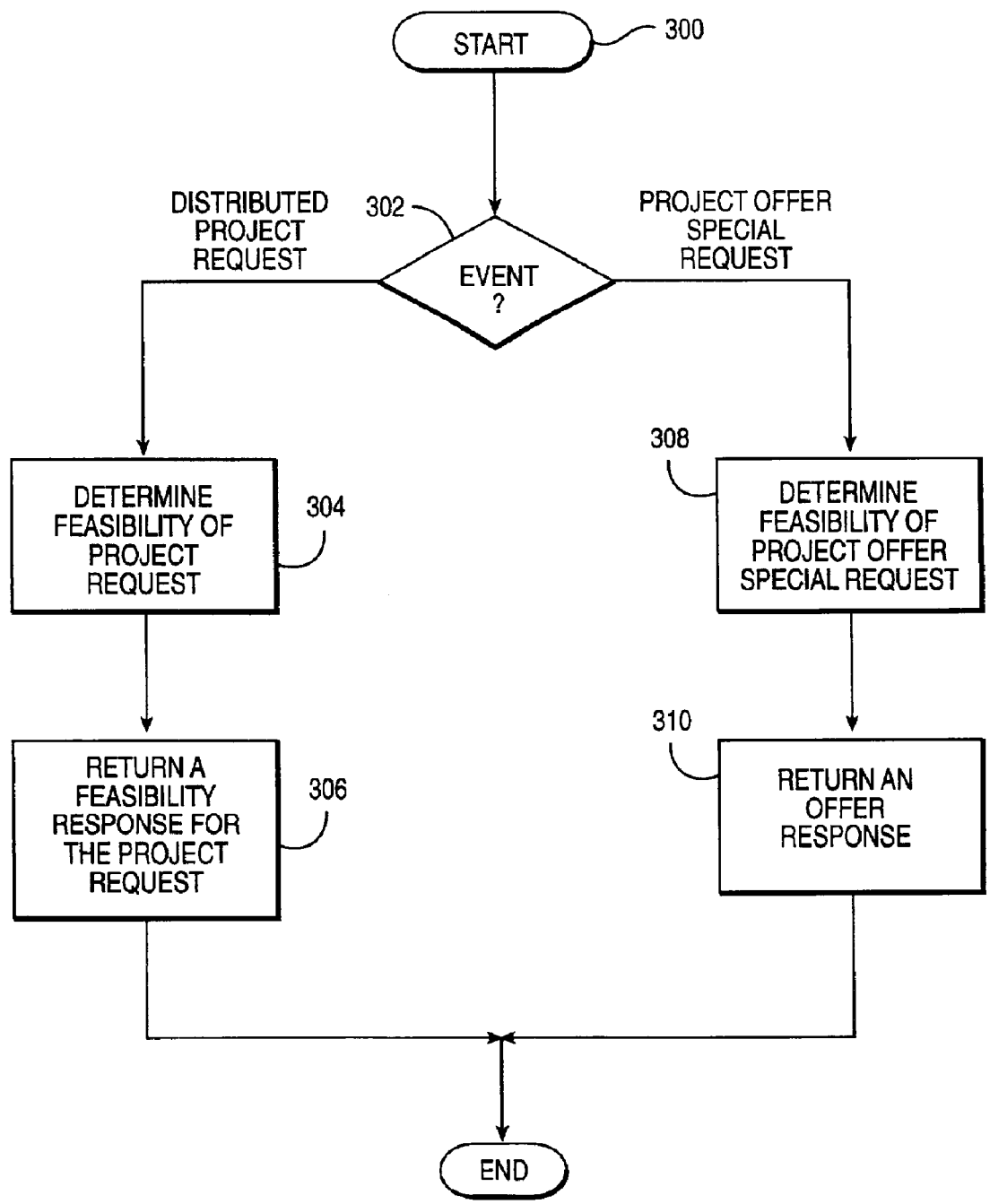
FIG. 17 depicts a high level logic flowchart of the process and program for controlling manufacturer responses to project requests and project offer special requests in accordance with the method, system and program of the present invention.

With reference now to FIG. 17, there is depicted a high level logic flowchart of the process and program for controlling manufacturer responses to project requests and project offer special requests in accordance with the method, system and program of the present invention. As illustrated, the process starts at block 300 and thereafter proceeds to block 302. In the present embodiment, the process illustrated is being performed by the manufacturer systems, however in alternate embodiments, the process illustrated may be performed by other client/server systems and may include alternate steps than those depicted.

Block 302 depicts a determination as to whether an event has been detected. If a distributed project request has been received, then the process passes to block 304. If a project offer special request has been received, then the process passes to block 308.

Block 304 illustrates determining the feasibility of a project request. The feasibility of a project request may be determined by multiple methods including both computer and human analysis such as comparing the project request with predetermined criteria, analyzing the project request according to current materials available, performing a cost analysis, and other functions that aid the manufacturer in determining feasibility. Ultimately, the manufacturer will decide to submit a bid for the project request based on the current project request or a project request adjusted by the manufacturer, suggest adjustments to the project request, or decline to participate in the project request. Next, block 306 depicts returning a feasibility response for the project request and the process ends.

Block 308 depicts determining the feasibility of a project offer special request. Manufacturers can determine the feasibility of manufacturing the project offer according to special requests made by customers. Ultimately, the manufacturer will decide to accept the special request, modify the special request or decline the special request. Next, block 310 illustrates returning an offer response for the project request and the process ends.

Preferably, specialized software tools may be provided to the manufacturer systems for determining the feasibility of project requests and project offer special requests from the manufacturer broker system or other provider. Particularly, software tools may include artificial intelligence (AI) applications that enable the manufacturing servers to make feasibility decisions in lieu of a human operator.

While the invention has been particularly shown and described with reference to a preferred embodiment, it will be understood by those skilled in the art that various changes in form and detail may be made therein without departing from the spirit and scope of the invention.

What is claimed is:

1. A method for controlling customized project orders comprising the steps of:
publishing a project offer for a project to a plurality of potential customers prior to manufacture;
receiving a plurality of order responses from a selection of said plurality of potential customers; wherein said prurality of order responses comprises a prurality of customized orders specifying project customization for said project;
processing, using at least one computer system, said plurality of order responses so as to assimilated said plurality of order responses into a customized manufacturing order; and
individually adjusting a price per unit of a product described by said customized manufacturing order for each response from among said plurality of order responses for each of said selection of said plurality of potential customers based on an history for each of said selection of said plurality of potential customers.

2. The method for controlling customized project orders according to claim 1, said method further comprising the step of:
publishing said project offer to and receiving said plurality of order responses at a broken server system communicatively connected through a network to said prurality of potential customers.

3. The method for controlling customized project order according to claim 1, said method further comprising the steps of:
receiving a project request and manufacturer selection; and
formulating said project offer based on said project request and manufacturer selection.

4. The method for controlling customized project orders according to claim 1, said step of publishing a project offer further comprising the steps of:
searching a customer watch list database according to categories associated with said project offer; and
publishing said project offer as a watch list selection.

5. The method for controlling customized project orders according to claim 1, said step of publishing a project offer further comprising the steps of:
receiving a search request for a particular category of project offers;
searching a project offer database for project offers associated with said particular category; and
publishing said project offer associated with said particular category.

6. The method for controlling customized project orders according to claim 1, said step of receiving a plurality of order responses from a selection of said plurality of potential customers, wherein said plurality of order responses comprises a plurality of customized orders specifying project customization for said project, further comprising the step of:
receiving said plurality of customized orders specifying project customization comprising customized selection from a plurality of adjustable options for said project offer.

7. The method for controlling customized project orders according to claim 1, said step of receiving a plurality of order responses from a selection of said plurality of potential customers, wherein said plurality of order responses comprise a plurality of customized orders specifying project customization for said project, further comprising the step of:
receiving said plurality of customized orders specifying project customization comprising customized selections from a plurality of customer-defined special instruction for said project offer.

8. The method for controlling customized project orders according to claim 1, said step of receiving a plurality of order responses further comprising the step of:
receiving said plurality of order responses wherein ordering said project is contingent upon a manufactured product being able to meet said customized manufacturing order.

9. The method for controlling customized project orders according to claim 1, said method further comprising the step of:
verifying said plurality of order responses with a manufacturer for said project.

10. The method for controlling customized project orders according to claim 1, said method further comprising the step of:
adjusting a price for said project according to a number of said plurality of offer responses received.

11. The method for controlling customized project orders according to claim 1, said method further comprising the step of:
manufacturing only a selection of said plurality of order responses as determined by a manufacturer for said project offer.

12. The method for controlling customized project orders according to claim 1, said method further comprising the step of:
managing financial settlement with each of said plurality of potential customers for said plurality of said project offer.

13. A system for controlling customized project orders comprising:
means for publishing a project offer for a project to a plurality of potential customers prior to manufacture;
means for receiving a plurality of order responses from a selection of said plurality of potential customers, wherein said plurality of order responses comprise a plurality of customized orders specifying project customization for said project;
means for assimilating said plurality of order responses into a customized manufacturing order; and
means for individually adjusting a price per unit of a product described by said customized manufacturing order for each order response from among said plurality of order responses for each of said selection of said plurality of potential customers based on an order history for each of said selection of said plurality of potential customers.

14. The system for controlling customized project orders according to claim 13, said method further comprising:
means for publishing said project offer to and receiving said plurality of order responses at a broken server system communicatively connected through a network to said plurality of potential customers.

15. The system for controlling customized project orders according to claim 13, said method further comprising:
means for receiving a project request and manufacturer selection; and
means for formulating a said project offer based on said project request and manufacturer selection.

16. The system for controlling customized project orders according to claim 13, said method further comprising:
means for searching a customer watch list database according to categories associated with said project offer; and
means for publishing said project offer as a watch list selection.

17. The system for controlling customized project orders according to claim 13, said means for publishing a project offer further comprising:
means for receiving a search request for a particular category of project offers;
means for searching a project offer database for project offers associated with said particular category; and
means for publishing said project offer associated with said particular category.

18. The system for controlling customized project orders according to claim 13, said means for receiving a plurality of order responses from a selection of said plurality of potential customers, wherein said plurality of order responses comprises a plurality of customized orders specifying project customization for said project, further comprising.
means for receiving said plurality of customized order specifying project customization comprising customized selection from a plurality of adjustable options for said project offer.

19. The system for controlling customized project orders according to claim 13, said means for receiving a plurality of order responses from a selection of said plurality of potential customers, wherein said plurality of order responses comprises a plurality of customized orders specifying project customization for said project, further comprising:
means for receiving said plurality of customized orders specifying project customization comprising customized selections of a plurality of customer-defined special instructions for said project offer.

20. The system for controlling customized project orders according to claim 13, said means for receiving a plurality of order responses further comprising:
means for receiving a plurality of order wherein ordering said project is contingent upon a manufactured product being able to meet said customized manufacturing order.

21. The system for controlling customized project orders according to claim 13, said further comprising:
means for verifying said plurality of order responses with a manufacturer for said project.

22. The system for controlling customized project according to claim 13, said system further comprising:
means for adjusting a price for said project according to a number of said plurality of offer responses received.

23. The system for controlling customized project orders according to claim 13, said system further comprising:
means for manufacturing only a selection of said plurality of orders responses as determined by a manufacturer for said project offer.

24. The system for controlling customized project orders according to claim 13, said system further comprising:
means for managing financial settlement with each of said plurality of potential customers for said plurality of order responses.

25. A program for customizing project manufacturing, said program embodiment in a computer-readable medium, said program comprising computer-executable instruction which cause a computer to perform the steps of:
transmitting a project offer for a project to a plurality of potential customers prior to manufactured;
receiving a plurality of order responses from a selection of said plurality of potential customers; wherein said plurality of order responses comprises a plurality of customized orders specifying project customization for said project;
enabling individual adjustment of a price per unit a product described by said customized manufacturing order for each order response from among said plurality of order responses for each of said selection of said plurality of potential customers based on order history for each of said selection of said plurality of potential customers.

26. The method for customizing project manufacturing according to claim 25, said program further comprising the step of:

receiving a project request and manufacturer selection; and enabling formulation of said project offer based on said project request and manufacturer selection.

27. The method for customizing project manufacturing according to claim 25, said program further comprising the step of:

searching a customer watch list database according to categories associated with said project offer; and searching a customers watch list database according to categories associated with said project offer; and transmitting said project offer as a watch list selection.

28. The method for customizing project manufacturing according to claim 25, said program further comprising the step of:

receiving a search request for a particular category of project offers;

searching a project offer database for project offers associated with said particular category; and transmitting said project offer associated with said particular category.

29. The method for customizing project manufacturing according to claim 25, said step of receiving a plurality of order responses from a selection of said plurality of potential customers, wherein said plurality of order responses comprise a plurality of customized orders specifying project customization for said project, further comprising the step of:

receiving said plurality of customized orders specifying customization comprising customized selections from a plurality of adjustable options for said project offer.

30. The method for customizing project manufacturing according to claim 25, said step of receiving a plurality of order responses from a selection of said plurality of potential customers, wherein said plurality of order responses comprise a plurality of customized orders specifying project customization for said project, further comprising the step of:

means said plurality of customized orders specifying project customization comprising customized selections of a plurality of customer-defined especial instruction for said project offer.

31. The method for customizing project manufacturing according to claim 25, said program further comprising the step of:

receiving said plurality of order responses wherein ordering said project is contingent upon a manufactured product being able to meet said customized manufacturing order.

32. The method for customizing project manufacturing according to claim 25, said program further comprising the step of:

receiving said plurality of order responses wherein ordering said project is contingent upon a manufactured product being able to meet said customized manufacturing order.

33. The method for customizing project manufacturing according to claim 25, said program further comprising the step of:

for adjusting a price for said project according to a number of said plurality of offer responses received.

34. The method for customizing project manufacturing according to claim 25, said program further comprising the step of:

manufacturing only a selection of said plurality of order responses as determined by a manufacturer for said project offer.

35. The method for customizing project manufacturing according to claim 25, said program further comprising the step of:

managing financial settlement with each of said plurality of potential customers for plurality of order responses.

* * * * *

UNITED STATES PATENT AND TRADEMARK OFFICE
CERTIFICATE OF CORRECTION

PATENT NO.       : 6,915,275 B2
APPLICATION NO.  : 09/876057
DATED            : July 5, 2005
INVENTOR(S)      : Dwip N. Banerjee et al.

It is certified that error appears in the above-identified patent and that said Letters Patent is hereby corrected as shown below:

Claim 1, Col. 17, line 65, "prurality of order responses comprises a prurality of" should read -- "plurality of order responses comprise a plurality of--

Claim 1, Col. 18, line 2, cancel "assimilated" and insert --assimilate--

Claim 1, Col. 18, line 7, insert --order-- after "each" and before "response"

Claim 1, Col. 18, line 9, insert --order-- after "an" and before "history"

Claim 2, Col. 18, line 15, cancel "broken" and insert --broker--

Claim 7, Col. 18, line 59, cancel "from" and insert --of--

Claim 7, Col. 18, line 60, cancel "instruction" and insert --instructions--

Claim 12, Col. 19, lines 21-22, cancel "said project offer" and insert --order responses--

Claim 14, Col. 19, line 42, cancel "method" and insert --system--

Claim 15, Col. 19, line 48, cancel "method" and insert --system--

Claim 15, Col. 19, line 51, cancel "a" before "said project offer"

Claim 16, Col. 19, line 54, cancel "method further comprising" and insert --means for publishing a project offer further comprising--

Claim 18, Col. 20, line 7, cancel "comprises" and insert --comprise--

Claim 18, Col. 20, line 10, cancel "order" and insert --orders--

Claim 18, Col. 20, line 12, cancel "selection" and insert --selections--

Claim 19, Col. 20, line 18, cancel "comprises" and insert --comprise--

Claim 20, Col. 20, line 28, cancel "a" and insert --said-- before "plurality"

Claim 20, Col. 20, line 28, insert --responses-- after "order" and before "wherein"

Claim 21, Col. 20, line 33, insert --system-- after "said" and before "further"

UNITED STATES PATENT AND TRADEMARK OFFICE
CERTIFICATE OF CORRECTION

PATENT NO. : 6,915,275 B2
APPLICATION NO. : 09/876057
DATED : July 5, 2005
INVENTOR(S) : Dwip N. Banerjee et al.

It is certified that error appears in the above-identified patent and that said Letters Patent is hereby corrected as shown below:

Claim 22, Col. 20, line 36, insert --orders-- after "project" and before "according"

Claim 25, Col. 20, line 51, cancel "embodiment" and insert --embodied--

Claim 25, Col. 20, line 52, cancel "instruction" and insert --instructions--

Claim 25, Col. 20, line 55, cancel "manufactured" and insert --manufacture--

Claim 25, Col. 20, line 57, cancel ";" and insert --,--

Claim 25, Col. 20, line 58, cancel "comprises" and insert --comprise--

Claim 25, Col. 20, line 60, insert --enabling assimilation of said plurality of order responses into a customized manufacturing order; and-- after "project;"

Claim 25, Col. 20, line 61, insert --of-- after "unit" and before "a"

Claim 26, Col. 21, line 1, cancel "method" and insert --program--

Claim 26, Col. 21, line 3, cancel "stop" and insert --steps--

Claim 27, Col. 21, line 8, cancel "method" and insert --program--

Claim 27, Col. 21, line 10, cancel "step" and insert --steps--

Claim 27, Col. 21, lines 13-14, cancel "searching a customers watch list database according to categories associated with said project offer;"

Claim 28, Col. 21, line 16, cancel "method" and insert --program--

Claim 28, Col. 21, line 18, cancel "step" and insert --steps--

Claim 29, Col. 21, line 26, cancel "method" and insert --program--

Claim 29, Col. 21, line 34, insert --project-- before "customization"

Claim 30, Col. 21, line 36, cancel "method" and insert --program--

Claim 30, Col. 22, line 4, cancel "means" and insert --receiving--

UNITED STATES PATENT AND TRADEMARK OFFICE
CERTIFICATE OF CORRECTION

PATENT NO. : 6,915,275 B2
APPLICATION NO. : 09/876057
DATED : July 5, 2005
INVENTOR(S) : Dwip N. Banerjee et al.

It is certified that error appears in the above-identified patent and that said Letters Patent is hereby corrected as shown below:

Claim 30, Col. 22, line 6, cancel "especial" and insert --special--

Claim 30, Col. 22, line 7, cancel "instruction" and insert --instructions--

Claim 31, Col. 22, line 8, cancel "method" and insert --program--

Claim 32, Col. 22, line 15, cancel "method" and insert --program--

Claim 32, Col. 22, lines 17-21, cancel "receiving said plurality of order responses wherein ordering said project is contingent upon a manufactured product being able to meet said customized manufacturing order" and insert --verifying said plurality of order responses with a manufacturer for said project--

Claim 33, Col. 22, line 22, cancel "method" and insert --program--

Claim 33, Col. 22, line 25, cancel "for" before "adjusting a price"

Claim 34, Col. 22, line 27, cancel "method" and insert --program--

Claim 35, Col. 22, line 33, cancel "method" and insert --program--

Claim 35, Col. 22, line 37, insert --said-- after "for" and before "plurality"

Signed and Sealed this

Fifth Day of September, 2006

JON W. DUDAS
*Director of the United States Patent and Trademark Office*

Disclaimer

6,915,275 — Dwip N. Banerjee, Austin, TX (US); Rabindranath Dutta, Austin, TX (US); and Kumar Ravi, Cedar Park, TX (US). MANAGING CUSTOMIZATION OF PROJECTS PRIOR TO MANUFACTURE IN AN ELECTRONIC COMMERCE SYSTEM. Patent dated July 5, 2005. Disclaimer filed October 5, 2006, by the assignee, International Business Machines Corporation.

Hereby enters this disclaimer to all of the claims, of said patent.

*(Official Gazette, May 27, 2008)*